United States Patent [19]
Odum

[11] Patent Number: 5,810,307
[45] Date of Patent: Sep. 22, 1998

[54] EXPLOSION-PROOF SWIVEL MOUNTING BRACKET

[75] Inventor: James M. Odum, Eden Prairie, Minn.

[73] Assignee: Detector Electronics Corporation, Minneapolis, Minn.

[21] Appl. No.: 700,839

[22] Filed: Aug. 21, 1996

[51] Int. Cl.⁶ .................................................. E04G 3/00
[52] U.S. Cl. ...................................... 248/278.1; 248/906
[58] Field of Search ............................... 248/278.1, 906, 248/274.1, 276.1, 282.1, 284.1, 289.11; 403/64, 91, 97, 84, 96

[56] References Cited

U.S. PATENT DOCUMENTS

| | | | |
|---|---|---|---|
| 2,616,029 | 10/1952 | Osowski | 248/278.1 |
| 3,361,404 | 1/1968 | Lohr | 248/278.1 |
| 3,517,903 | 6/1970 | Gutshall | 248/205.1 |
| 3,742,209 | 6/1973 | Williams | 248/278.1 |
| 3,919,458 | 11/1975 | Perrault et al. | 248/906 |
| 4,447,170 | 5/1984 | Holmes | 248/278.1 |
| 4,529,881 | 7/1985 | Ceurvels et al. | 250/353 |

*Primary Examiner*—Ramon O. Ramirez
*Assistant Examiner*—Anita M. King
*Attorney, Agent, or Firm*—Merchant, Gould, Smith, Edell, Welter & Schmidt, P.A.

[57] ABSTRACT

A swivel mounting bracket for attachment to an electrical junction box and to a detector device, the swivel mounting bracket having two identical fittings. Each fitting has an internal passageway which progresses around a 90° bend, and each fitting has a mounting plate at one end and a mounting base at the other end, positioned orthogonal to each other. Each mounting plate has an arcuate groove with an internal shoulder for facilitating attachment to a mounting base. The mounting base of one fitting is attachable to the mounting plate of the other fitting, and the respective remaining fitting ends are attached to the junction box at a detector.

8 Claims, 3 Drawing Sheets

EXPLOSION-PROOF SWIVEL MOUNTING BRACKET

BACKGROUND OF THE INVENTION

This invention relates to an explosion-proof swivel mounting bracket which is attachable to an explosion-proof electrical junction box and a radiation detector. The radiation detector preferably used in connection with the present invention is an optical detector which incorporates a detector element positioned inside of an explosion-proof housing and facing a viewing window through the housing so as to receive radiation which occurs in the region in front of the viewing window. Radiation detection devices of the type intended for use in connection with the invention are typically mounted in a hazardous atmosphere and positioned for viewing an area in which there is a strong likelihood of combustion. Such radiation detectors may be of the type disclosed in U.S. Pat. 3,952,196, issued in April 1976, which discloses the construction and particulars of an optical radiation detector.

Because there is a need for the optical radiation detector window to be facing the combustion source, the mounting arrangements sometimes present particular problems. These problems are compounded because of the need to construct the components which house electrical circuits of heavy, explosion-proof materials. This is required to prevent the possibility of any internal electrical circuit malfunctions from igniting a potentially explosive or combustible atmosphere outside the electrical circuit box.

Explosion-proof electrical junction boxes are well known in the art, and the techniques for constructing optical radiation detectors in explosion-proof housings are also well known. However, it is not always possible to ridgedly mount a radiation detector to an explosion-proof junction box while at the same time permitting the optical detector to have the optimum field of view. The field of view is governed by the relative positions of the combustion source and the electrical wiring location which must be connected into the junction box. Further, the optimum field of view may vary from time to time at a given location because of changed circumstances in the hazardous environment.

It is, therefore, an advantage to provide an explosion-proof device for enabling the positioning and repositioning of the radiation detector in a hazardous environment. One such device is described in U.S. Pat. 4,529,881, issued Jul. 16, 1985. The disclosed device comprises a radiation detector mounted within an explosion-proof housing which has a viewing window at one end of the housing inclined at an angle of 45°. The sections of the housing are rotatable relative to each other to permit the viewing window to be rotatably positioned about the axis of rotation.

SUMMARY OF THE INVENTION

The present invention comprises an explosion-proof swivel mounting bracket which is directly attached to an explosion-proof electrical junction box. The mounting bracket is constructed of two identical components, each of which comprise a fitting having an internal passageway arranged around a 90° bend. In each case, one end of the fitting has a mounting plate having a flat end surface, and a pair of arcuate grooves formed near a plate edge; and the other end of the fitting comprises a mounting base having a flat end surface and a plurality of threaded openings therethrough. The two fittings are attached together with the mounting plate of one fitting contacting the mounting base of the other plate, and the respective remaining ends of the fittings are connected to an explosion-proof junction box and a radiation detector. The interconnection of these components provides the flexibility to move the viewing window of the radiation detector to any desired position and to thereafter securely tighten the fittings together and to the junction box to provide a permanent, explosion-proof housing.

It is a principal object of the present invention to provide an explosion-proof swivel mounting bracket which permits a wide range of mounting positions for a radiation detector.

It is another object of the present invention to provide a swivel mounting bracket which can be easily repositioned and tightly secured any number of times without degrading the explosion-proof functions.

It is a further object of the present invention to provide an explosion-proof swivel mounting bracket which can be formed of two identical fittings which may be respectively attached to an explosion-proof junction box and to a radiation detector.

Other and further objects and advantages of the present invention will become apparent from the following specification and claims and with reference to the appended drawings.

DESCRIPTION OF THE PREFERRED EMBODIMENT

Figure 1:
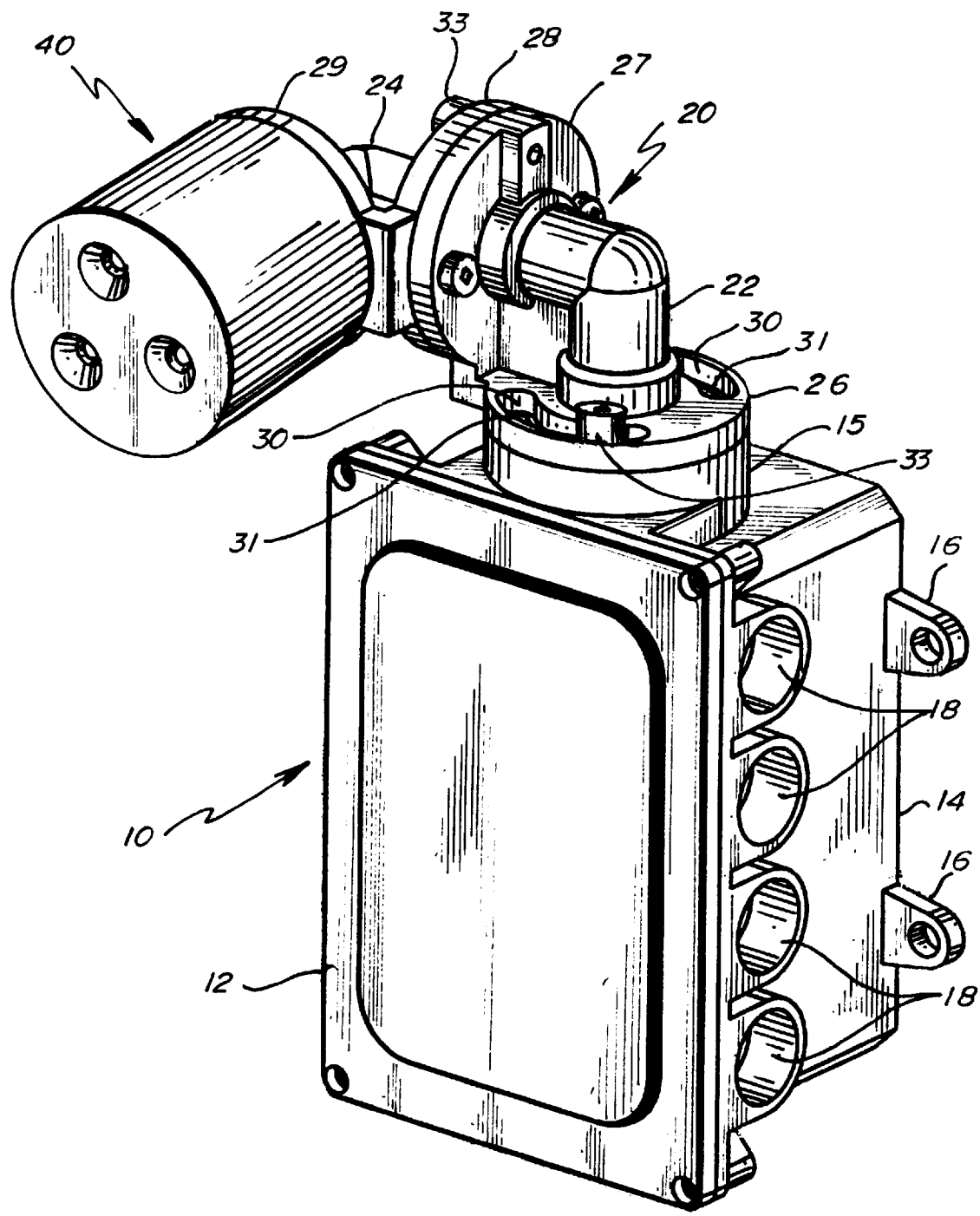
FIG. 1 shows an isometric view of the invention attached to explosion-proof junction box.

Referring first to FIG. 1, an electrical junction box 10 is shown in isometric view, attached to a swivel mounting bracket 20 and a detector 40. Junction box 10 has a removable cover 12 and a box housing 14. Box housing 14 may be affixed to a wall or other surface by using mounting tabs 16. A plurality of electrical conduit openings 18 are formed through the side walls of box housing 14, and at least one box mounting base 15 projects outwardly from the end of box housing 14. Box mounting base 15 has a central opening therethrough (not shown) which permits the passage of wires from the interior of box housing 14 through the passageways in swivel mounting bracket 20. Swivel mounting bracket 20 is comprised of two identical fittings 22 and 24. Each fitting is formed with a right angle passageway therethrough, in the nature of a right angle elbow, and each fitting has a mounting plate at one end and a mounting base at the other end. For example, fitting 22 has a mounting plate 26 at its lower end and has a mounting base 27 at its upper end. Fitting 24 has a mounting plate 28 at its first end facing against mounting base 27 and has a mounting base 29 at its other end. Mounting base 29 is attachable to the housing of an optical detector 40. Each mounting plate has a pair of arcuate grooves 30 extending approximately 90° around its periphery. A recessed shoulder 31 is formed within each groove 30 to seat against the head of a lock screw 33 which may be threadably inserted into openings in the corresponding mounting base to which the mounting plate is attached.

Figure 2:
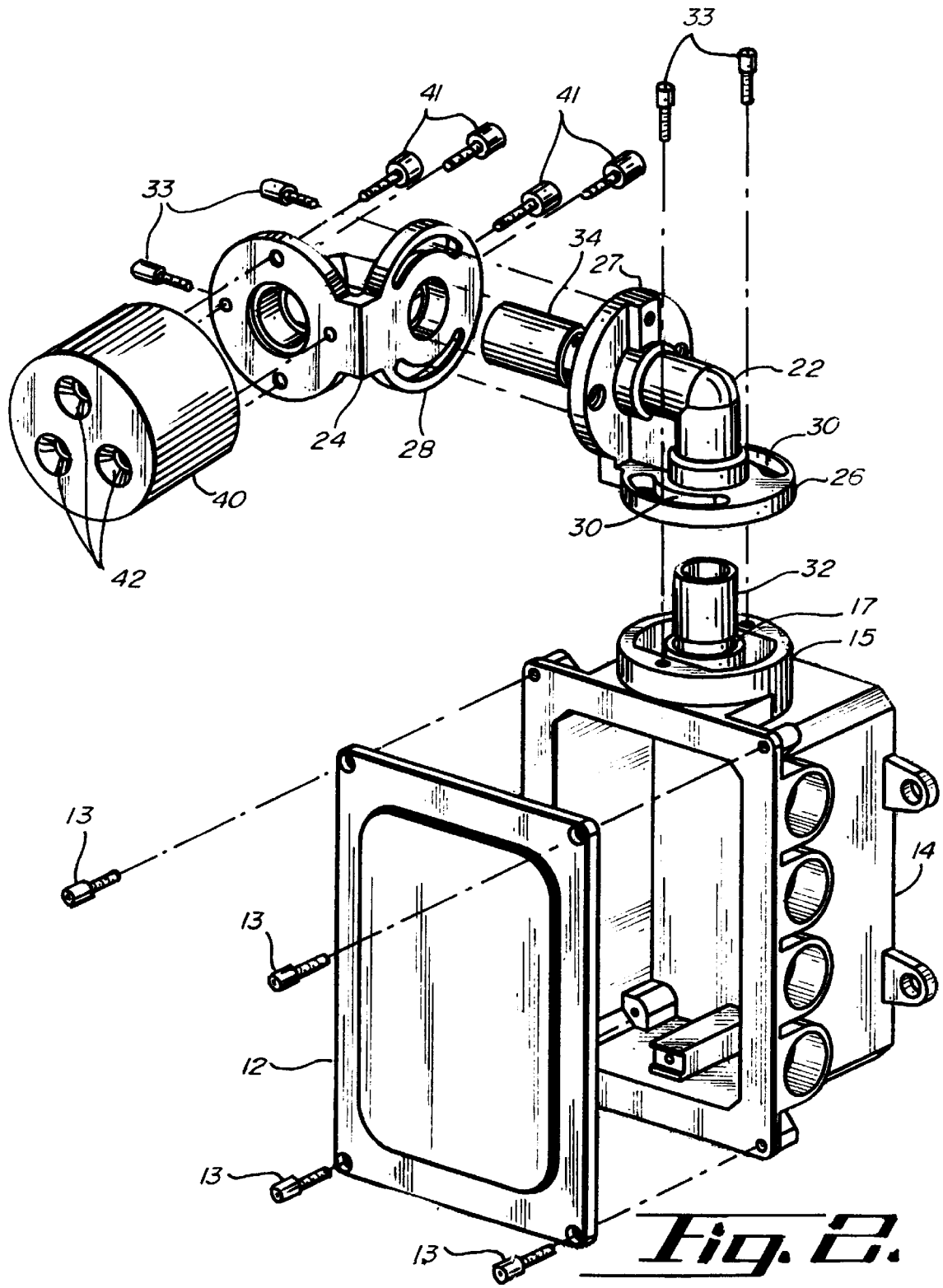
FIG. 2 shows the invention in exploded view relative to the respective mounting components.

FIG. 2 shows an exploded view illustrating the respective components of the invention and the alignment paths for fitting each component to its adjacent component. The alignment paths are indicated by dotted lines. Cover 12 is secured to box housing 14 by screw fasteners 13. A sleeve 32 is snugly fitted into the passageway 17 which opens upwardly from junction box 14 and box mounting base 15. Similarly, sleeve 32 is fitted snugly into the interior passage of fitting 22. Mounting plate 26 may be affixed to box mounting base 15 by means of the lock screws 33 which seat into grooves 30 and which are abutted against the interior shoulders 31. The fasteners may be slightly loosened in order to rotatably position mounting plate 26 relative to box housing 14.

A similar mounting arrangement is used with respect to the attachment of mounting plate 28 against mounting base 27. A sleeve 34 is snugly fitted into the respective internal passages in fittings 22 and 24, and mounting plate 28 may then be rotatably affixed to mounting base 27 by the use of the lock screws 33. A detector 40 is affixed to mounting base 29 by means of threaded fasteners 41 which mount through the four holes in mounting base 29. Detector 40 has at least one viewing window 42 which may be positioned to face the region of combustion which is to be observed. Detector 40 is preferably an optical detector, although other forms of detectors may also be used with the invention. It should be emphasized that fittings 22 and 24 are identically constructed but are positioned as shown in FIG. 2 for obtaining a wide range of rotational positioning along two axes.

Figure 3:
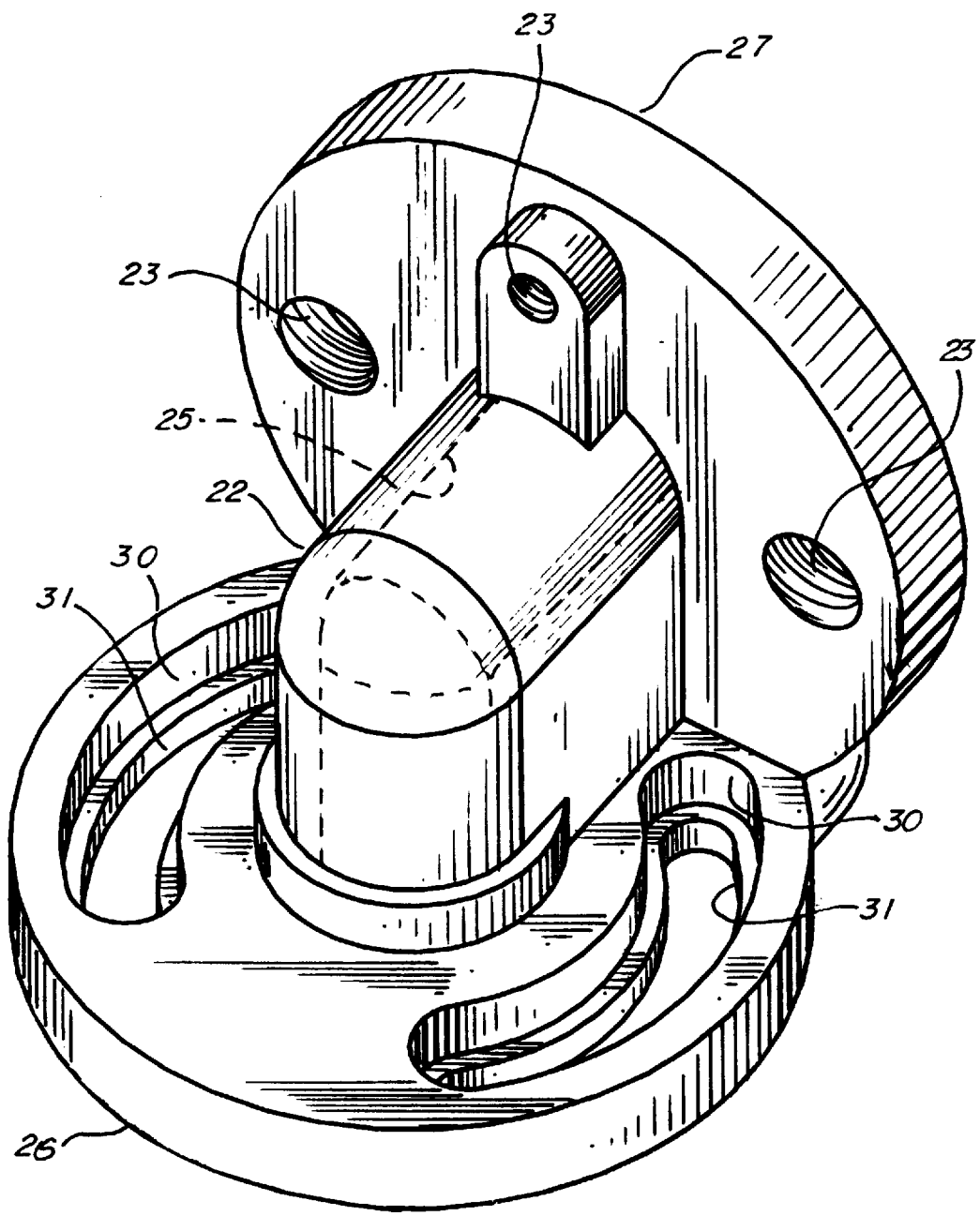
FIG. 3 shows an enlarged view of one of the two identical fittings.

FIG. 3 shows an enlarged view of one of the fittings, for purposes of illustration, fitting 22. This view clearly illustrates the arcuate shape of groove 30 and the shape of raised shoulder 31 which is sized to abut against the head of a suitable locking screw. Openings 23 through mounting base 27 may be threaded to accept suitable mounting screws. The fittings 22, 24 are preferably constructed of metallic material suitable for confining electrical wires and conductors, and the internal, right angle passageway 25 is shown in dotted outline. The mounting plate 26 is joined to the mounting base 27 at a common intersection. It is preferable that each fitting be made from a single piece of material to achieve a sufficient amount of strength, and the joining together of the mounting plate 26 and mounting base 27 contributes to the overall strength of the fitting.

In operation, the electrical junction box 10 is fixedly mounted against a wall or other bulkhead; and the control wiring and other wires required for operation of the detector circuits are fed into the interior of the junction box 10. The wires from the detector 40 are also fed through the internal passageways of fittings 22 and 24 and into the interior of junction box 40. The necessary electrical connections may then be made in the interior of junction box 40 to facilitate the operation of the detector. The threaded fasteners which pass through the respective arcuate grooves 30 may then be slightly loosened to rotatably position fitting 22 and fitting 24 at suitable angles so as to position the viewing windows 42 of detector 40 in a direction facing the zone of combustion of interest. The screws through grooves 30 may then be tightened to fixedly attach the components together, and thereafter the detector 40 will be fixedly mounted via swivel mounting bracket 20 to the junction box 10.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A swivel mounting bracket for adjustably connecting a detector to an electrical junction box comprising a pair of fittings of identical construction, each fitting comprising a mounting base having an outer flat surface and a mounting plate having an outer flat surface, the mounting plate further comprising a pair of arcuate grooves normal to the outer surface and the mounting base comprising at least a pair of mounting holes alignable with said arcuate grooves of an adjacent fitting; the mounting base and the mounting plate are positioned at right angles relative to each other and a right angle passageway extends between the respective outer flat surfaces; and a tubular section sized to snugly fit within a portion of the right angle passageway and projecting from one fitting outer surface and into a passageway of an adjacent fitting outer surface.

2. The mounting bracket of claim 1, further comprising a detector affixed to one fitting mounting base, and a junction box affixed to the other fitting mounting plate.

3. An explosion-proof mounting system for connecting a detector to a junction box and for selectively positioning the detector relative to the junction box, comprising:

a) a junction box having a passageway opening, and a mounting pedestal about said opening, said mounting pedestal having a flat outer surface and mounting holes therein;

b) a first fitting having a first right angle passageway therethrough, the passageway opening through a first mounting plate at one end and through a first mounting base at the other end, both the first mounting base and the first mounting plate having an outer flat surface, the first mounting plate further comprising a pair of first arcuate grooves normal to the outer surface and the first mounting base further comprising at least two mounting holes normal to the outer surface; said first fitting being attached to said junction box pedestal by threaded fasteners through said arcuate grooves;

c) a second fitting identical in construction to said first fitting, whereby a second mounting plate of said second fitting is attachable to the first mounting base of the first fitting by threaded fasteners through second arcuate grooves of the second fitting;

d) a first tubular section sized to fit into a second passageway opening through the second fitting mounting plate and into the first passageway opening through the first mounting base of the first fitting.

e) a second tubular section sized to fit into the first passageway opening through the first mounting plate of the first fitting and into the passageway opening through said junction box pedestal; and f) a detector attached to the second mounting base of the second fitting;

whereby said first fitting is rotatably attached to said junction box and said second fitting is rotatably attached to said first fitting and said detector is fixedly attached to said second fitting.

4. The system of claim 3, wherein said arcuate grooves each further comprise a groove extending approximately 90° about said passageway.

5. A swivel mounting bracket and wire conduit, comprising a pair of right angle tubular conduit fittings, each fitting comprising an end plate at the respective ends of said right angle conduit, the end plates being joined together at a common intersection and each end plate having an outwardly facing flat surface; one end plate having a pair of arcuate grooves therethrough and the second end plate having a plurality of threaded holes; whereby a fitting end plate having arcuate grooves may be aligned with another fitting end plate with threaded holes, and threaded fasteners may be inserted through said grooves and into said threaded holes for securing two fittings together.

6. The bracket and conduit of claim 5, wherein said arcuate grooves each traverse approximately a 90° angle about the end plate.

7. The bracket and conduit of claim 6, further comprising a shoulder recessed in each of said arcuate grooves.

8. The bracket and conduit of claim 7, further comprising a tubular section sized for insertion into either end of said tubular conduit, said tubular member being of sufficient length to project outwardly from said end plate.

* * * * *